United States Patent
Murakami

(10) Patent No.: US 7,359,623 B2
(45) Date of Patent: Apr. 15, 2008

(54) FILE REPRODUCING APPARATUS AND FILE REPRODUCING METHOD

(75) Inventor: Yuzo Murakami, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 913 days.

(21) Appl. No.: 10/365,528

(22) Filed: Feb. 13, 2003

(65) Prior Publication Data

US 2003/0225952 A1    Dec. 4, 2003

(30) Foreign Application Priority Data

Feb. 18, 2002   (JP) .............................. 2002-039503

(51) Int. Cl.
*H04N 5/91* (2006.01)
(52) U.S. Cl. ........................... 386/123; 710/200; 707/1
(58) Field of Classification Search ................ 386/123; 707/1; 710/200
See application file for complete search history.

(56) References Cited

U.S. PATENT DOCUMENTS 6,058,390 A * 5/2000 Liaw et al. ..................... 707/2

2001/0016841 A1 * 8/2001 Karasudani .................... 707/1

FOREIGN PATENT DOCUMENTS

| | | |
|---|---|---|
| CN | 1264120 | 8/2000 |
| JP | 2-7137 | 1/1990 |
| JP | 7-220457 | 8/1995 |
| JP | 2000224543 | 8/2000 |
| JP | 2001-338484 | 12/2001 |

* cited by examiner

*Primary Examiner*—Thai Q. Tran
*Assistant Examiner*—Girumsew Wendmagegn
(74) *Attorney, Agent, or Firm*—Wenderoth, Lind & Ponack, L.L.P.

(57) ABSTRACT

A file reproducing apparatus for reproducing files recorded on a recording medium by using a FAT (File Allocation Table) file system, which includes a cluster table which associates offset positions indicating the distances from the head of the file set at the predetermined offset intervals with cluster numbers indicating locations of the files recorded on the recording medium in which the data at the corresponding offset positions are stored. During a reproduction operation in a reverse direction which proceeds from the end of the file toward the head, the location of the data to be read is determined with reference to the cluster table.

14 Claims, 13 Drawing Sheets

20 CLUSTER TABLE

| OFFSET POINT | OFFSET POSITION | CLUSTER NUMBER |
|---|---|---|
| 0 | (L/8) × 0 | A |
| 1 | (L/8) × 1 | B |
| 2 | (L/8) × 2 | C |
| 3 | (L/8) × 3 | D |
| 4 | (L/8) × 4 | E |
| 5 | (L/8) × 5 | F |
| 6 | (L/8) × 6 | G |
| 7 | (L/8) × 7 | H |

Fig. 4

150 HEADER AREA

151 CHUNK OFFSET TABLE   153 FRAME SIZE TABLE

| CHUNK NUMBER | OFFSET POSITION | FRAME NUMBER | FRAME SIZE |
|---|---|---|---|
| 1 | 0×0001 | 1 | 04000 |
| 2 | 0×0B0 | 2 | 03800 |
| 3 | 0×120 | 3 | 05000 |
| ⋮ | ⋮ | ⋮ | ⋮ |

Fig. 10

| FRAME NUMBER | CLUSTER NUMBER | OFFSET POSITION (BYTE) FROM THE FILE HEAD |
|---|---|---|
| 1 | 0×0034 | 0×00004000 |
| 6 | 0×005A | 0×0001C000 |
| 11 | 0×0061 | 0×00030000 |
| ⋮ | ⋮ | |
| M-5 | 0×07BC | 0×00188000 |
| M | 0×07F2 | 0×001B8000 |
| M+5 | 0×0819 | 0×001CC000 |
| ⋮ | ⋮ | |

| FAT ENTRY | 0x0002 | 0x0003 | 0x0004 | 0x0005 | 0x0006 | 0x0007 | 0x0008 | 0x0009 | 0x000A |
|---|---|---|---|---|---|---|---|---|---|
| FIRST STORAGE AREA | 0x0003 | 0x0004 | 0x0008 | 0x0006 | 0x0007 | 0x000A | 0x0009 | 0xFFFF | 0x000B |
| SECOND STORAGE AREA | 0xFFFF | 0x0002 | 0x0003 | 0xFFFF | 0x0005 | 0x0006 | 0x0004 | 0x0008 | 0x0007 |

FILE REPRODUCING APPARATUS AND FILE REPRODUCING METHOD

BACKGROUND OF THE INVENTION

1. Field of the Invention

The present invention relates to a file reproducing apparatus and a file reproducing method for reproducing motion picture files recorded on a recording medium by using a FAT file system.

2. Related Art

In recent years, mobile data processing apparatuses such as digital still cameras have come to be provided with the function of recording and reproducing motion pictures in addition to still pictures. For the recording of still and motion pictures, most of these data processing apparatuses adopt a recording medium which is a semiconductor memory-equipped detachable card. The recording of data onto such a recording medium is managed file by file by the FAT (File Allocation Table) file system of disk operating system (hereinafter referred to as DOS).

With increasingly greater capacities of recent recording media, there is a trend that the recording time of motion pictures is becoming longer. The increased recording time of motion pictures requires the double-speed reproducing function such as fast forward and rewind during reproduction so as to retrieve desired scenes as soon as possible. The double-speed reproduction in a motion picture file is usually achieved by skipping the video frames of the motion picture file at a constant interval. A motion picture file is recorded on a recording medium in units of clusters. The clusters in which file data are stored are not necessarily recorded in order of increasing or decreasing cluster numbers because of properties of the FAT file system. Therefore, the position of the video frame to be reproduced is retrieved based on the information of the cluster number indicated on the file allocation table (hereinafter referred to as FAT).

The retrieving operation of a file with the use of the FAT will be described as follows with reference to FIG. 12. A recording medium generally contains directory information 203*a* and FAT 202*a* as file management information. In the FAT 202*a*, at a position corresponding to a cluster number of one cluster, a cluster number of the other cluster which follows the one cluster is recorded.

When a motion picture file is reproduced, the directory information 203*a* is first referred to, and then the leading cluster number of the motion picture file is acquired based on the file name of the motion picture file. Then, data in the cluster (cluster 2 in FIG. 12) of the leading cluster number in the data region 204 of the recording medium is read and reproduced. After this, FAT 202*a* is referred to and the cluster number of the cluster to be reproduced next (cluster 3 in FIG. 12) is acquired so as to read and reproduce data from the data region 204. Hereafter, the cluster numbers of the clusters to be reproduced next are acquired in sequence while referring to FAT 202*a* until the value of the FAT 202*a* reaches "0xFFFF" which indicates the end of the file. By specifying clusters one by one in this manner, the entire file is being read out.

However, the conventional FAT shown in FIG. 12 can be read only in the forward direction from the head of a file towards the end, and has problems in reading data in the reverse direction. More specifically, to specify one cluster immediately before the other cluster, it needs to read the FAT from the head in sequence to specify the cluster number of the one cluster when the other cluster appears. This takes a lot of time to specify the cluster number, making it impossible to read data smoothly in the reverse direction. The prior art disclosed in Japanese Patent Laid-open Publication No. 2001-338484 has solved this problem.

In the prior art, as shown in FIG. 13, the FAT is provided with a first storage area storing, at a position corresponding to a cluster number of one cluster, a cluster number of a cluster immediately following the one cluster and a second storage area storing, at the position, a cluster number of cluster immediately preceding the one cluster. This enables rapid reading in the reverse direction. For example, to retrieve a cluster number of cluster immediately before the cluster with a cluster number of "0x0008", the second storage area with respect to a FAT entry corresponding to the cluster number of "0x0008" is referred. This allows a cluster number ("0x0004") of a cluster immediately before the cluster having the cluster number of "0x0008" to be rapidly retrieved.

However, in the prior art, the FAT equipped with the second storage area is stored in the recording medium, which causes the problem of consuming the capacity of the recording medium. With an increase in the file size to be allocated by the FAT, the second storage area increases its capacity, thereby further consuming the capacity of the recording medium. This problem is particularly serious in the system using a recording medium with a small capacity (such as digital still cameras using a memory card).

SUMMARY OF THE INVENTION

In view of the above problem, the present invention has an object of providing a file reproducing apparatus and a file reproducing method which are capable of managing files and is suitable to read data in the reverse direction, without consuming the capacity of the recording medium.

In a first aspect of the invention, a file reproducing apparatus is provided for reproducing files recorded on a recording medium by using a FAT file system. The apparatus includes a reading section that reads data of a file from the recording medium, a reproduction processor that applies a predetermined reproduction process to the data read by the reading section, a data storage device, and a controller that controls the reading section, the reproduction processor, and the data storage section. The data storage device stores a cluster table which associates an offset position indicating a position from the head of a file and set at a predetermined offset interval with a cluster number indicating a location on the recording medium on which data at the corresponding offset position is stored. The controller determines a location on the recording medium at which the data to be read is located with reference to the cluster table during a reproducing operation in a reverse direction which proceeds from the end of the file toward the head thereof.

The file to be reproduced contains motion picture data that may include a plurality of video frames.

When the entire motion picture data is divided into substantially equally into N (N is a natural number) parts, the offset interval may be equal to a data length of one part.

The offset interval may be equal to a data length of N (N is a natural number) video frames.

The number N of video frames can be changed according to a securable vacant capacity of the data storage device.

The controller may generate the cluster table on the data storage device when the motion picture data is reproduced in a forward direction. In the case where the cluster number of a video frame is already recorded in the cluster table, the controller preferably may not generate a cluster table related to the video frame when the video frame is going to be reproduced again in the forward direction.

When a new cluster table is generated in the presence of the formerly generated cluster table, the controller preferably may overwrite a region of the storage device on which the formerly generated cluster table is stored to generate the new cluster table.

In the second aspect of the invention, a file reproducing method is provided for reproducing files recorded on a recording medium by using a FAT file system. In the method, a cluster table is generated which associates an offset position indicating a position from the head of a file and set at a predetermined offset interval with a cluster number indicating a location on the recording medium on which data at the corresponding offset position is stored. Next, a location on the recording medium is determined, at which the data to be read is located with reference to the cluster table, during a reproducing operation in a reverse direction which proceeds from the end of the file toward the head thereof.

BRIEF DESCRIPTION OF THE DRAWINGS

FIG. 4 is a view showing the chunk offset table and the frame size table contained in the header area of the motion picture file (First Embodiment).

FIG. 10 is a view showing another structure of the cluster table (Third Embodiment).

FIG. 13 is a view showing the structure of the conventional FAT which manages cluster numbers of the subsequent clusters.

DETAILED DESCRIPTION OF THE INVENTION

The preferred embodiments of the file reproducing apparatus and method according to the present invention will be described in detail as follows with reference to the attached drawings.

First Embodiment

Figure 1:
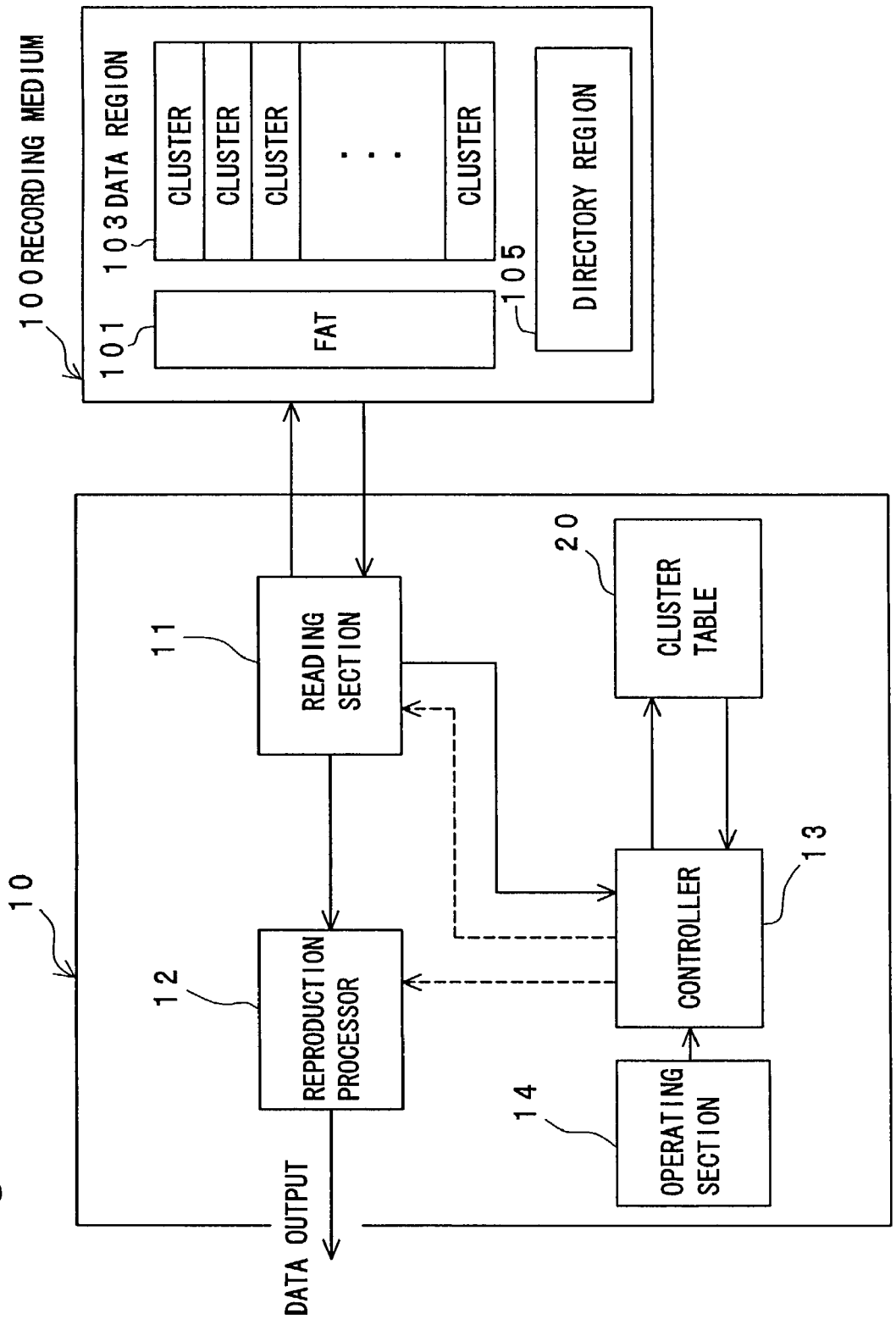
FIG. 1 shows the structure of the file reproducing apparatus of the present invention.

FIG. 1 shows a configuration of a file reproducing apparatus of the present invention for reproducing files recorded on a recording medium by using a FAT file system of DOS.

The file reproducing apparatus 10 includes a reading section 11, a reproduction processor 12, a controller 13, and an operating section 14. The reading section 11 reads and reproduces the FAT (File Allocation Table) or data in clusters from the recording medium 100. The reproduction processor 12 performs a reproduction process of data such as motion pictures read by the reading section 11. The controller 13 controls the reading section 11 and the reproduction processor 12. The operating section 14 receives setting data provided by a user through predetermined buttons and the like, and transmits the setting data to the controller 13. The recording medium 100 is detachable and attachable from/to the file reproducing apparatus 10 and contains semiconductor memory capable of recording motion picture files.

The recording medium 100 includes a FAT 101, a data region 103 for storing data, and a directory region 105 for storing directory data. The FAT 101 is a file system which is written in the recording medium 100 in order to manage data in file. In the data region 103 data is managed cluster by cluster, which is the minimum access unit. Directory data to be stored in the directory region 105 is data to manage files, and contains file name, extension name, attribute, recording date and time, leading cluster number, file length, and the like, for each file.

The file reproducing apparatus 10 is also equipped with a cluster table 20 which associates, at predetermined intervals in the forward direction from the head of the file towards the end, positional data indicating a position from the file head with a cluster number indicating a location on the recording medium at which the file is recorded. The cluster table 20 is stored in a data storage device such as DRAM installed in the apparatus 10.

The cluster table 20 will be described as follows with reference to FIG. 2.

Figures 2A, 2B:
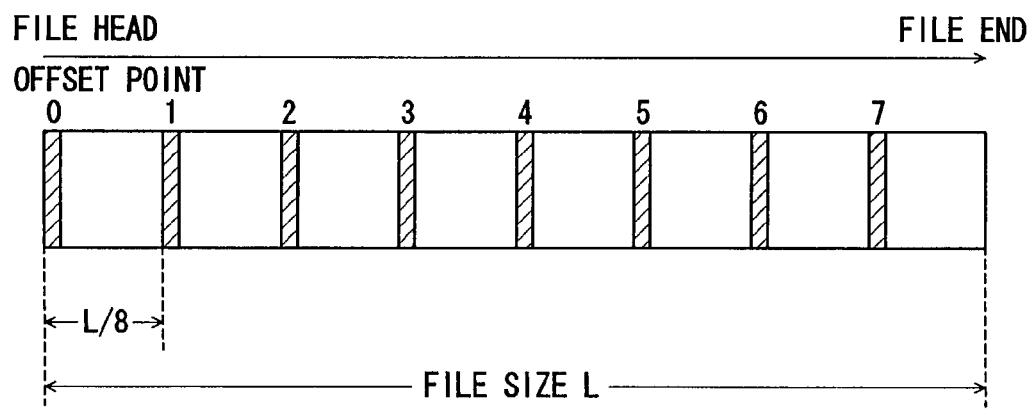
FIG. 2A is a view showing offset points.
FIG. 2B is a view showing a cluster table.

The cluster table 20 manages offset positions from the file head and cluster numbers at predetermined offset points. The offset points are set at substantially regular intervals in the entire file to be allocated as shown in FIG. 2A. The number of the offset points is 8 in the preset embodiment. In other words, the offset points indicate the head positions of the divided sections when the size of the file to be allocated is evenly divided into a predetermined number (8 in the present case). When the file cannot be divided quite evenly, the remainder is adjusted in the last section. The offset position indicating a distance from the file head of the n-th offset point is expressed by $(L/8) \times n$ ($n=0$ through 7) when the file size is L. As shown in FIG. 2B, the cluster table 20 manages the offset points, the offset positions, and the cluster numbers of the clusters in the offset positions by bringing them into correspondence with each other. Thus using the offset points determined by dividing nearly equally the entire file makes the number of the offset points constant irrespective of an increase in the file size. This makes it possible to keep the size of the cluster table 20 constant, regardless of the size of a file to be allocated.

Figure 3:
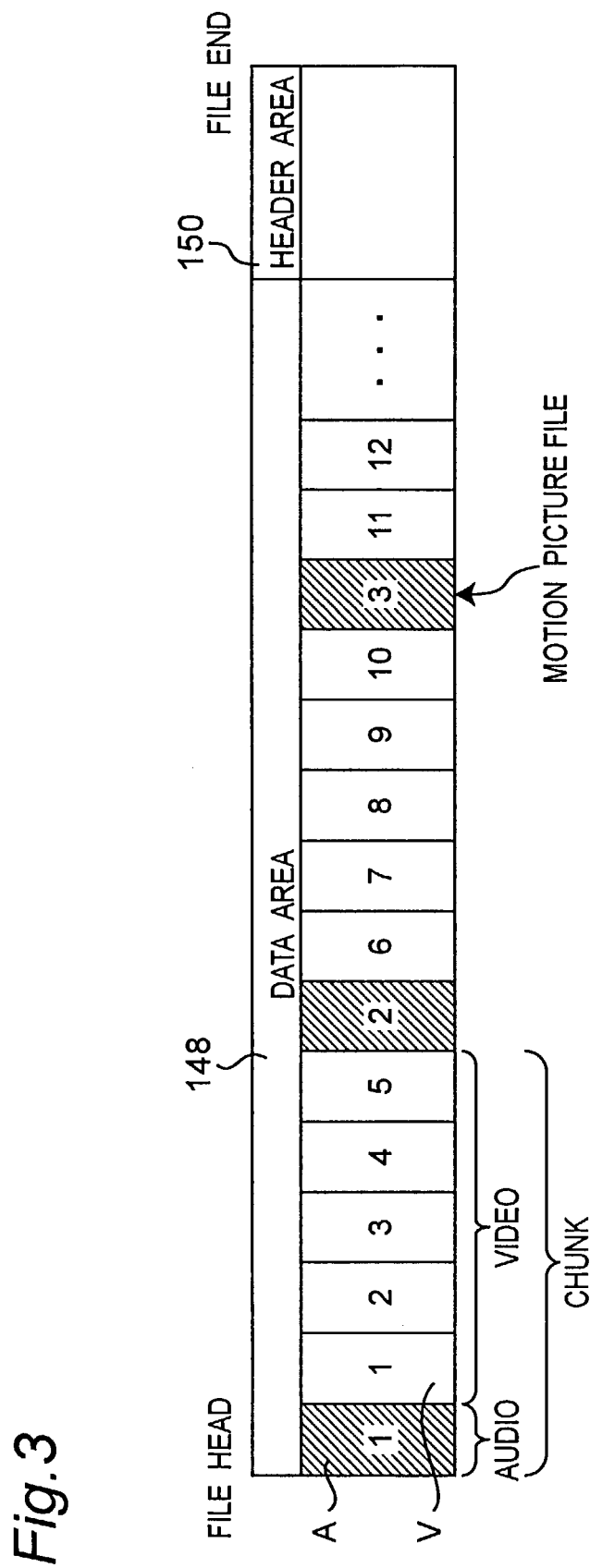
FIG. 3 is a view showing the structure of the motion picture file.

The structure of the motion picture file will be described as follows with reference to FIG. 3.

A motion picture file includes a data area 148 in which video frames V and audio data A (the shaded areas in the drawing) recorded in synchronization with the video frames V are recorded in sequence, and a header area 150 in which auxiliary data about the motion picture file is recorded. In the motion picture file, at least one video frame V and the audio data A for a predetermined time length are managed as one set called a "chunk".

As shown in FIG. 4 the header area 150 contains a chunk offset table 151 which manages data regarding the offset position from the file head in each chunk and a frame size table 153 which manages the size data of each video frame or each audio data. The chunk offset table 151 and the frame size table 153 are separately provided for the video frames and the audio data, respectively. It is noted that besides these tables, the header area 150 also contains, for example, data about the head clusters of the video frames and data indicating which chunk a video frame belongs to.

The operation of the file reproducing apparatus structured as above will be described as follows.

Figure 5:
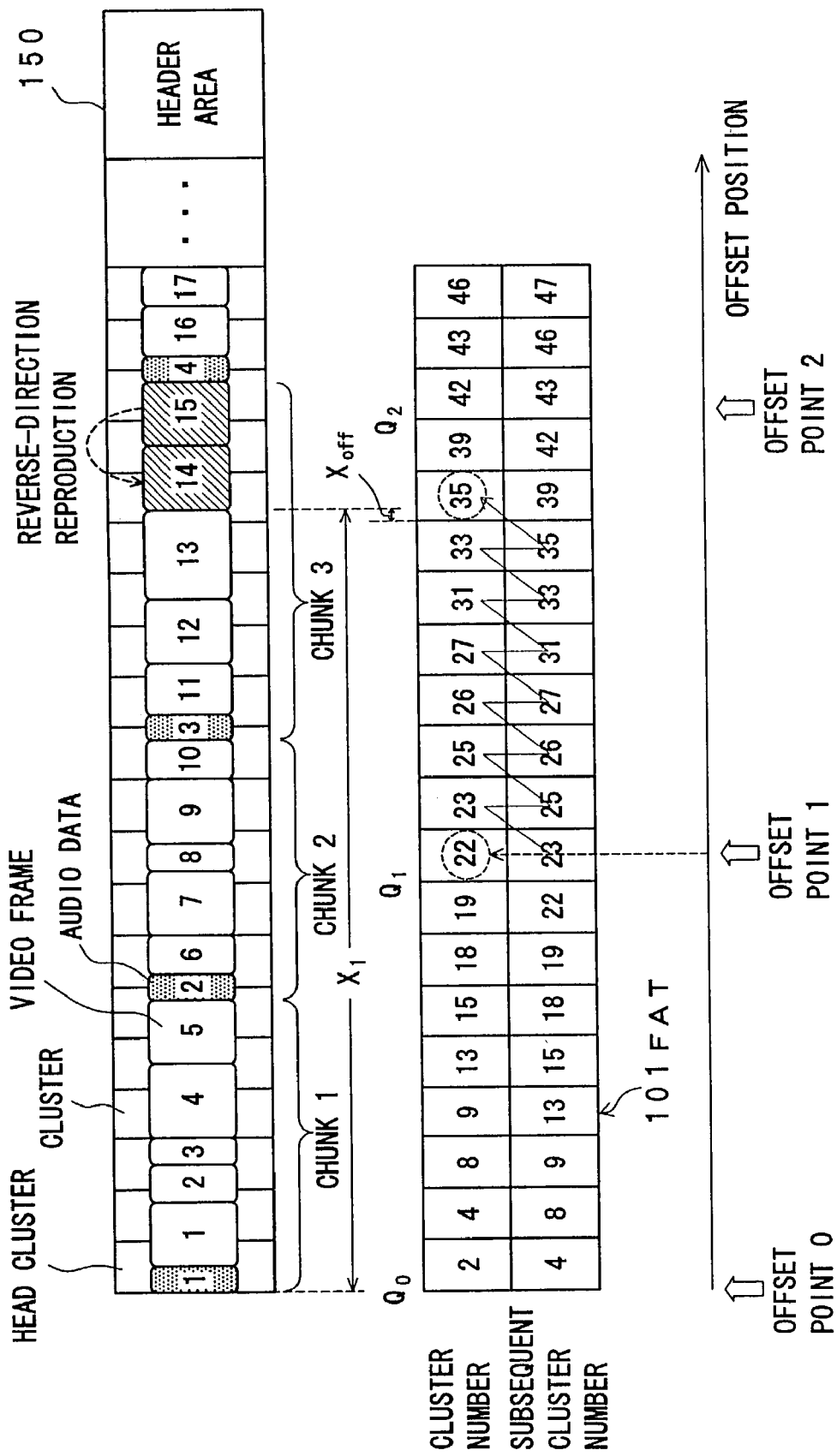
FIG. 5 is a view showing the single-speed reverse-direction reproducing operation of the file reproducing apparatus (First Embodiment).

The reproducing operation of a motion picture file in the reverse direction at a single speed will be described with reference to FIGS. 5 and 6. In the single-speed reproducing operation, consecutive video frames are reproduced in sequence. This process is executed by the controller 13 (Procedures described below is the same as the above mentioned). The following description shows the case where as shown in FIG. 5 the video frame which is currently being reproduced is Frame #15 and the frame to be reproduced next in the reverse direction is Frame #14.

Figure 6:
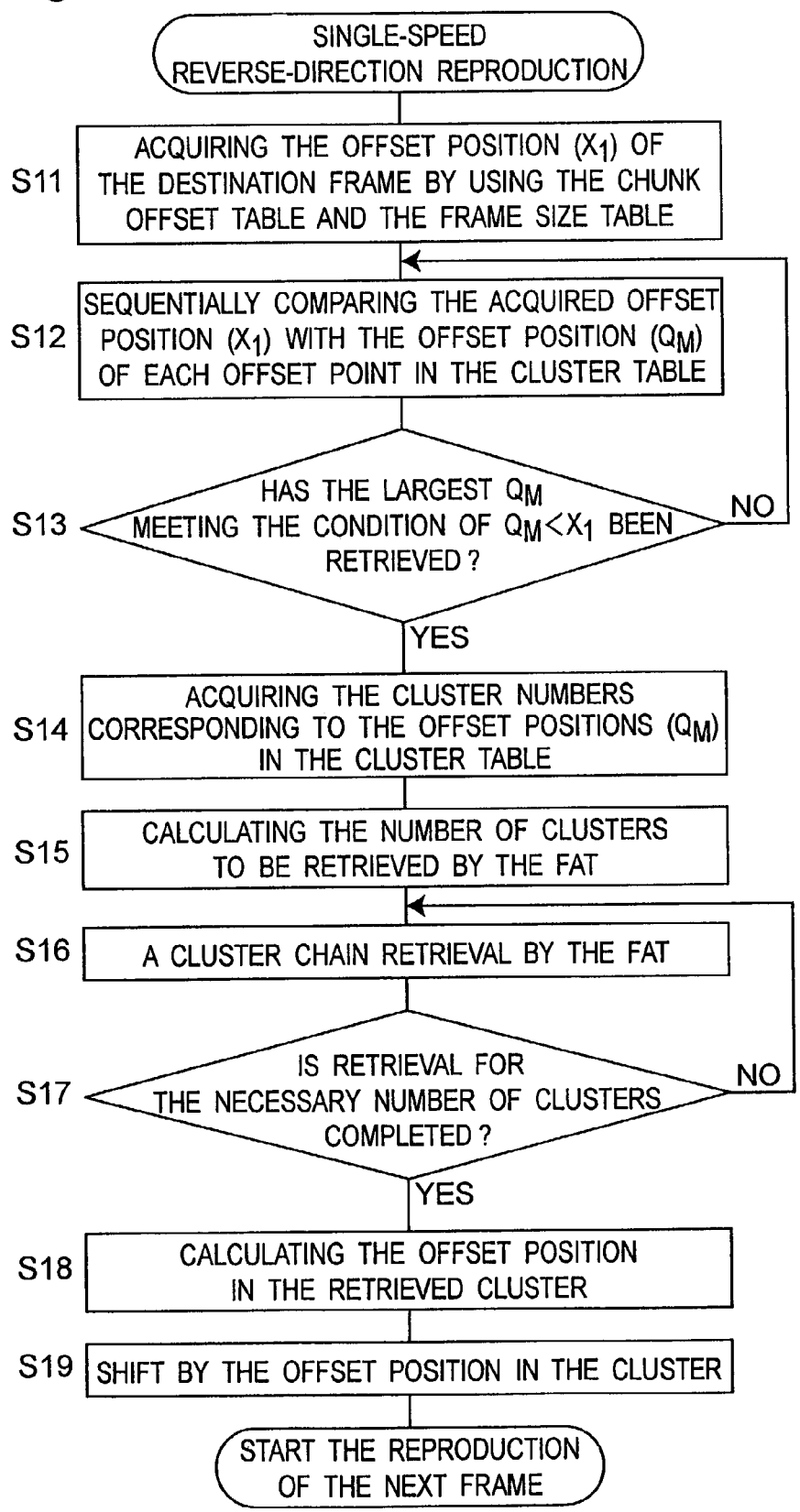
FIG. 6 is a flowchart of the single-speed reverse-direction reproducing operation of the file reproducing apparatus (First Embodiment).

In the flowchart of FIG. 6, after the reproduction of the currently reproduced frame (Frame #15) is completed, an offset position ($X_1$) from the head of the motion picture file of the next reproduced frame (Frame #14) is acquired (S11). At this moment, the offset position ($X_1$) of Frame #14 can be found by referring to the chunk offset table 151 and the frame size table 153 in the header area 150. To be more specific, the controller 13 reads data in the header area 150 of the motion picture file, specifies a chunk (Chunk #3) to which the frame to be reproduced next belongs, and acquires the offset position from the file head in the chunk by referring to the chunk offset table 151. Then, the controller 13 refers to the frame size table 153 and obtains the offset of the frame to be reproduced next from the chunk head. Adding the obtained offset to the previously acquired offset from the file head of the chunk can provide the offset position ($X_1$) from the file head of Frame #14.

The acquired offset position ($X_1$) is sequentially compared with the offset position ($Q_M$) of each offset point in the cluster table 20 (S12). The largest one of offset positions ($Q_M$) which meet the condition of $Q_M<X_1$ is retrieved (S13). When the largest offset position ($Q_M$) is found (Yes at S13), a cluster number corresponding to the offset position ($Q_M$) is acquired (S14). In the case shown in FIG. 5, since Frame #14 is the frame to be reproduced next, there are offset positions $Q_0$ and $Q_1$ as the offset positions ($Q_M$) which meet the condition of $Q_M<X_1$, and the offset position $Q_1$ having the largest value becomes the offset position to be found. Then the cluster number "22" corresponding to the offset position is found.

The number of clusters required for the FAT retrieval from the cluster having the cluster number found at Step S14 to the frame to be reproduced next is calculated (S15). The number of clusters necessary can be calculated from the value of the offset position ($X_1$) from the file head and the offset position ($Q_M$) of the offset point found. Cluster chain retrieval of the FAT is performed for the number of clusters calculated (S16, S17). In the case of FIG. 5, the FAT retrieval is performed for 7 clusters up to Cluster #35 starting from Cluster #22.

After this, the offset position in the retrieved cluster of the frame to be reproduced next is calculated (S18). The offset position in the cluster is determined as the remainder obtained when the value of the offset position ($X_1$) of the next produced frame from the file head is divided by the number of clusters. In the case of FIG. 5, the offset position ($X_{off}$) from the head of Cluster #35 of Frame #14 is calculated.

Finally, the reading position is shifted by the offset position in the cluster (S19), and the reading of data in the next frame is started from that position. The read video frame is reproduced by the reproduction processor 102.

A reproduction in the reverse direction can be performed by referring to the cluster table 20 as described above.

In the present embodiment, the cluster table 20 is provided on the file reproducing apparatus side, which never causes the capacity of the recording medium 100 to be consumed. This configuration is useful to a system using a recording medium with a small capacity (for example, digital still cameras with a memory card).

The recording medium 100 can be any kind of a medium. Although a motion picture file is taken as an example of the file to be reproduced, other files containing voice or text data can be reproduced as well. Furthermore, an arbitrary file format can be used. The region in which to store the cluster table 20 can be realized on an arbitrary memory space securable.

Although the present embodiment exclusively shows the reproduction of a video frame in the reverse direction, voice signals could be reproduced together with pictures. The voices can be intermittent voices in synchronization with the video frames to be reproduced at the predetermined intervals, or can be continuous voices to be reproduced at high speed.

The rate of the reproduction in the reverse direction can be so designed as to be set freely by the user on the operating section 14. The controller 13 intermittently finds the video frame to be reproduced next, based on the setting rate on the operating section 14, and acquires the offset position $X_1$ of the video frame at Step S11 so as to realize reproduction in the reverse direction at a desired rate.

The process of producing the cluster table 20 will be described as follows with reference to the flowchart of FIG. 7.

The cluster table 20 is generated when a motion picture file is reproduced in the forward direction. Motion picture files have the operational property that reproduction cannot get started from the middle of the motion picture data and must restart from the head of the file whenever the motion picture file is executed, unlike data reproduction by a video tape recorder or a disk reproducing apparatus. Therefore, a reproduction in the forward direction should be done immediately before a reproduction in the reverse direction, and the cluster table 20 is produced during such a forward-direction reproduction. Alternatively, when a normal reproduction in the forward-direction independent of a reverse-direction reproduction is done before a reverse-direction reproduction, the cluster table 20 can be produced during that forward-direction reproduction.

Figure 7:
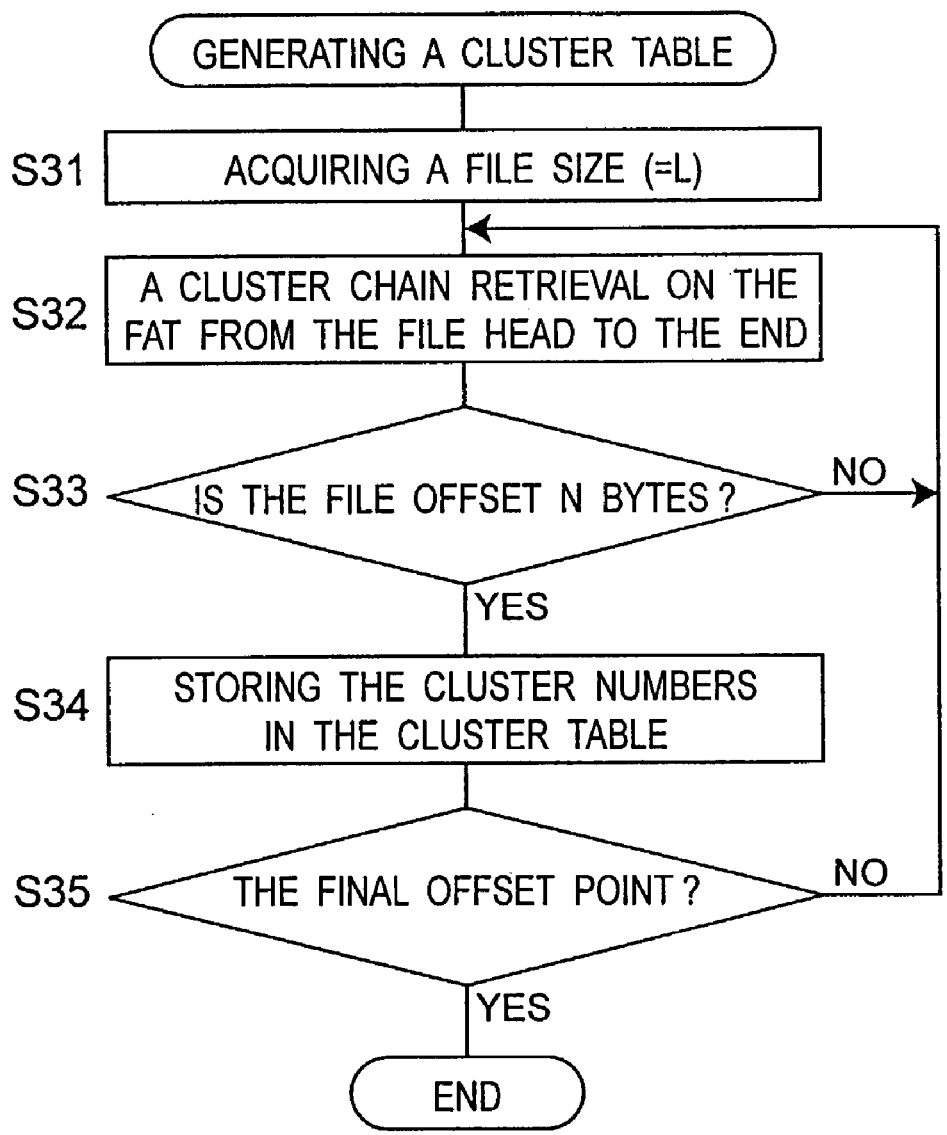
FIG. 7 is a flowchart of producing the cluster table of the First Embodiment.

As shown in FIG. 7, at first, the file size (L) of a motion picture file is acquired from the directory data (S31). A cluster chain retrieval for sequentially retrieving the cluster numbers of data on the FAT is carried out from the file head towards the end. As a result, the cluster numbers of the clusters to be reproduced in sequence are acquired. It is determined whether the clusters sequentially acquired by the cluster chain retrieval are the clusters on the predetermined offset points or not (S33). To be more specific, the offset from the file head of the clusters acquired sequentially by the cluster chain retrieval is obtained and then it is determined whether the values of the offset is N (=(L/P)×M) bytes or not (S33). Here, P indicates the number of offset points (8 in the present embodiment), M is an offset point number, and M=0, 1, 2, - - - , (P−1). When a cluster acquired by the cluster chain retrieval is the cluster on the offset point, the cluster number and the offset position are stored in the cluster table (S34). The aforementioned procedure is repeated until the final offset point is reached (S35). As the result of this procedure, the cluster table 20 as shown in FIG. 2 which manages the cluster number for each offset point can be generated.

Although eight offset points are provided in this embodiment, the number of the offset points is not restricted to it.

When video frames in a motion picture file already having the cluster table 20 are reproduced again, a new cluster table is not produced. This can omit useless processes.

It is preferable to overwrite the cluster table 20 with a new one on the same storage region every time a different file is reproduced. Producing a cluster table by using the same memory space can save the memory usage because more than one cluster table is never produced.

Although a cluster table is produced during a file reproduction in the present embodiment, it can be produced before the reproduction. Since data in the header area must be read before the reproduction, it is necessary to perform a cluster retrieval in sequence from the file head according to the FAT after the user manipulates reproduction buttons until the reproduction is actually started, thereby reading the header area of the file end. Therefore, it is possible to produce a cluster table in parallel with the cluster retrieval at the time of reading the header area.

Second Embodiment

The present embodiment will describe operations in a file reproducing apparatus for reproducing only the frames at the head of chunk during the reverse-direction reproduction. That is, during the reverse-direction reproduction, the video frames at the chunk heads ( - - - , 16, 11, 6, 1) are reproduced in the reverse direction (refer to FIG. 8). When the number of the video frames contained in one chunk is n, n-speed reproduction in the reverse direction becomes possible by exclusively reproducing the frames at the chunk heads.

Figure 8:
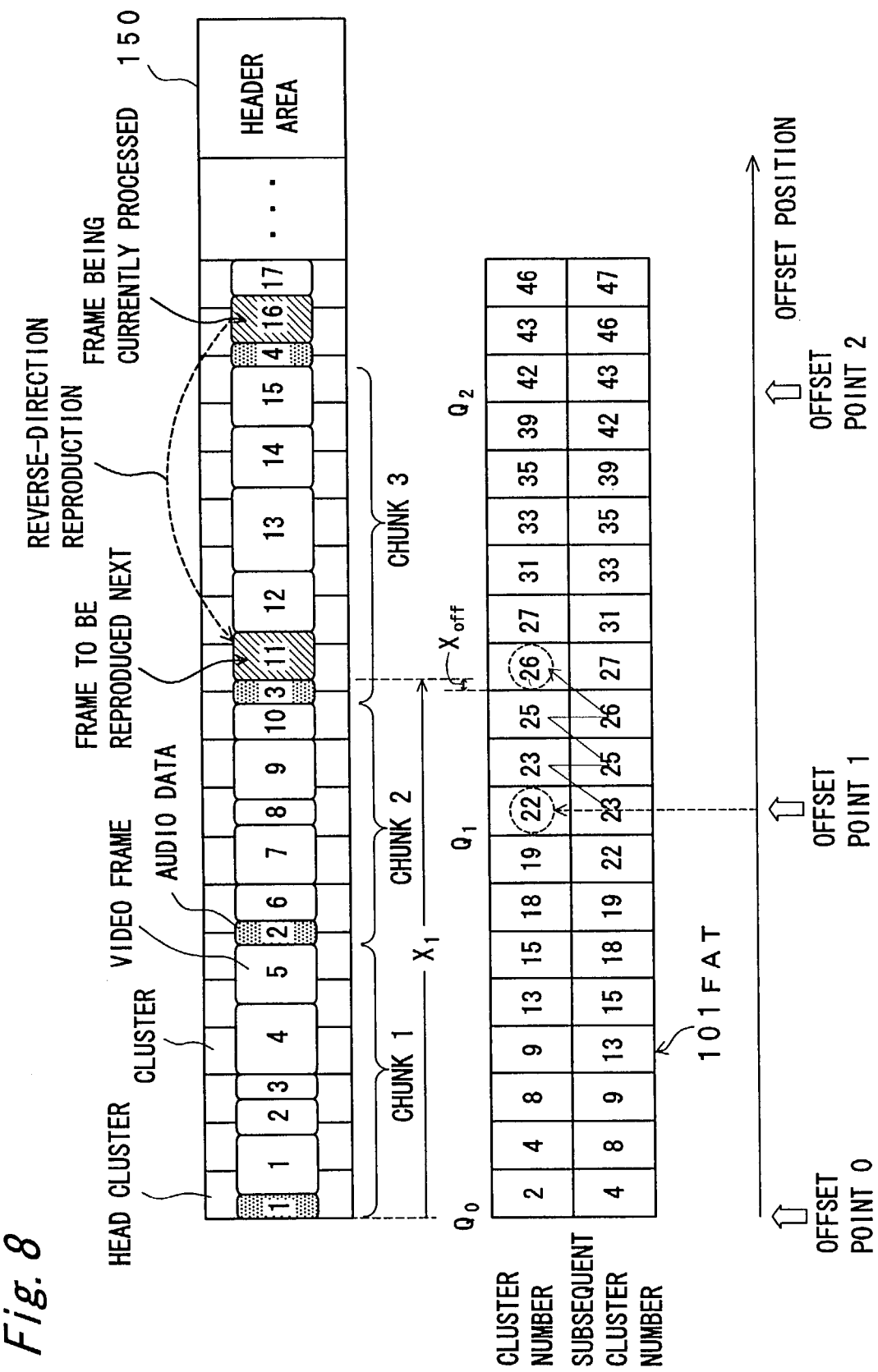
FIG. 8 is a view showing the n-speed reverse-direction reproducing operation of the file reproducing apparatus (Second Embodiment).

The n-speed reproducing operation in the reverse direction of a motion picture file will be described with reference to FIGS. 8 and 9. The following description shows the case where as shown in FIG. 8, a video frame which is currently being reproduced is Frame #16, and a frame to be reproduced next in the reverse direction is Frame #11.

Figure 9:
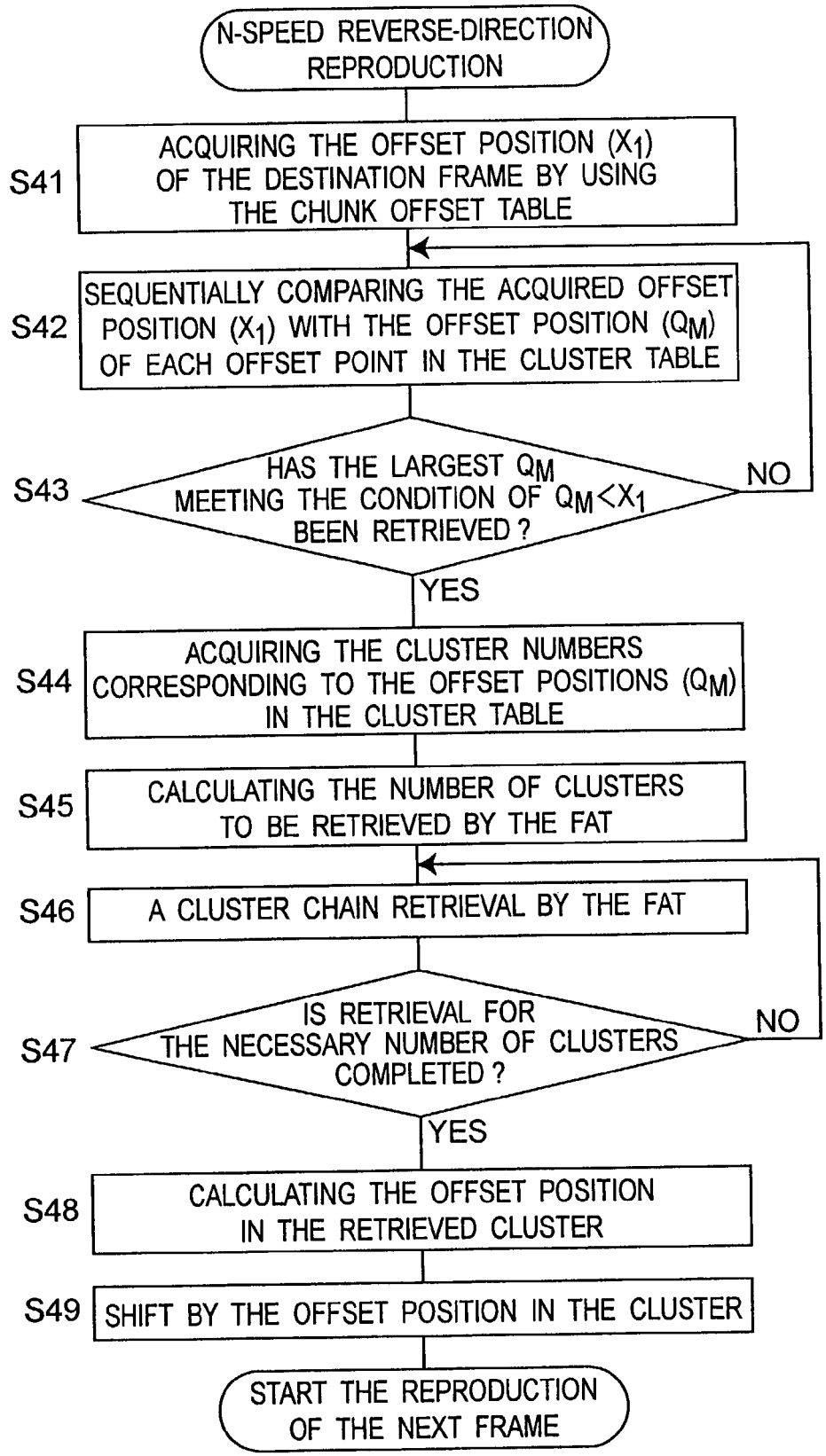
FIG. 9 is a flowchart of the n-speed reverse-direction reproducing operation of the file reproducing apparatus (Second Embodiment).

Referring to FIG. 9, after the completion of the reproduction of Frame #16, the offset position ($X_1$) from the head of the motion picture file to Frame #11 which is to be reproduced next is acquired (S41). At this moment, the offset position ($X_1$) of Frame #11 is found by referring to only the chunk table 148 in the header area 150. To be more specific, in the case of the n-speed reproduction, the frames to be reproduced are always at the chunk heads. Hence, when the offset position of the chunk containing Frame #11 to be reproduced next is known by using the chunk offset table 148, the offset position ($X_1$) of Frame #11 from the file head is soon found out.

The subsequent operations (Steps S42 to S49) are the same as the operations in Steps S12 to S19 in the flowchart of FIG. 6, respectively.

Performing the aforementioned operations can easily achieve an n-speed reproduction in the reverse direction.

Third Embodiment

In the above embodiments, the number of offset points is made constant regardless of the file size in a cluster table. In a cluster table of the present embodiment, offset points are set by fixing the intervals (offset intervals) between offset points. Therefore, the number of offset points is changed depending on the file size. The offset intervals are, for example, set at N times (N is a natural number) the length of the video frames. The offset intervals (the value of N) could be changed according to the securable vacant capacity of the storage means in which the cluster table is stored.

FIG. 10 shows a cluster table 30 of the present embodiment. The cluster table 30 manages the cluster numbers and the offset positions every 5 frames.

A method for generating a cluster table of the present embodiment will be described as follows with reference to the flowchart of FIG. 11.

Figure 11:
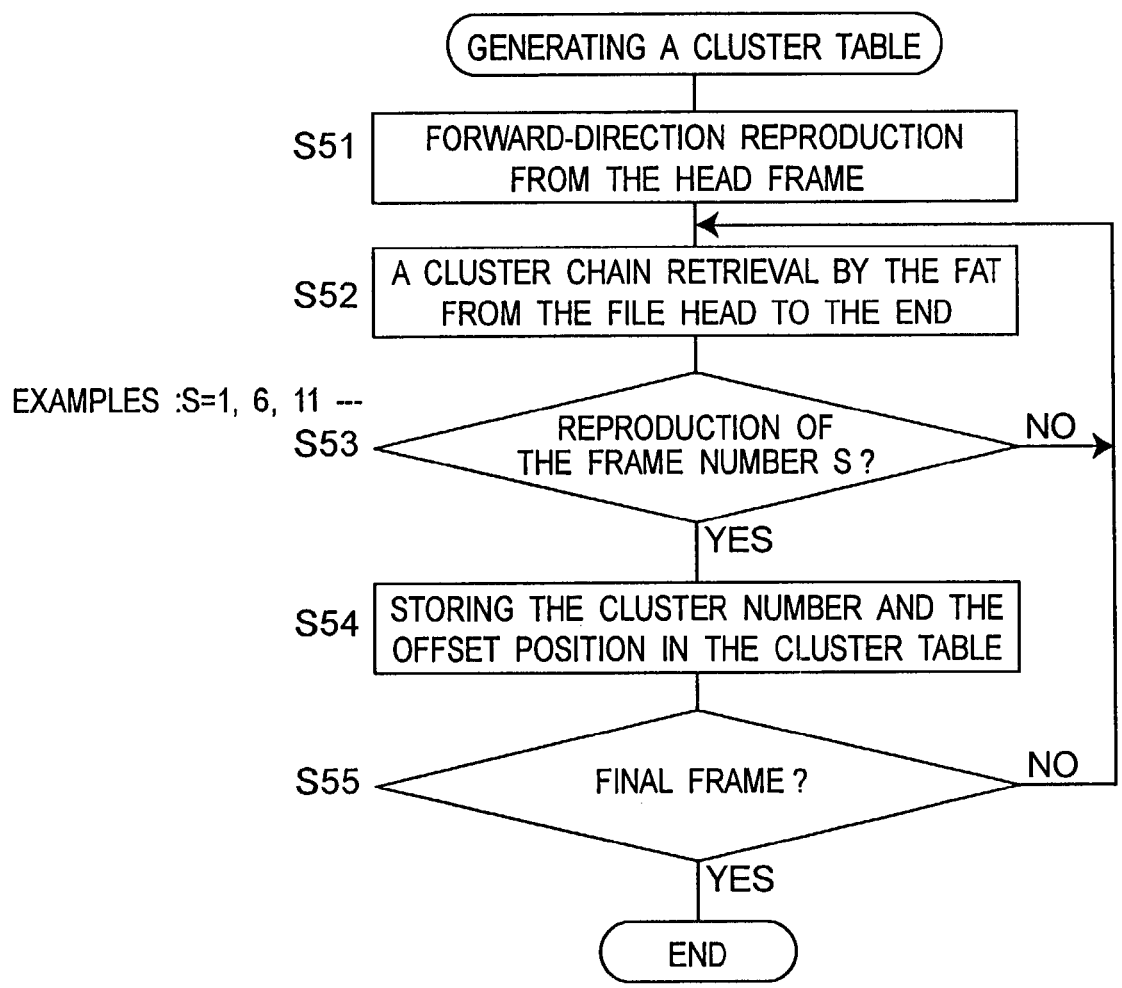
FIG. 11 is a flowchart of producing the cluster table of the Third Embodiment.
Figure 12:
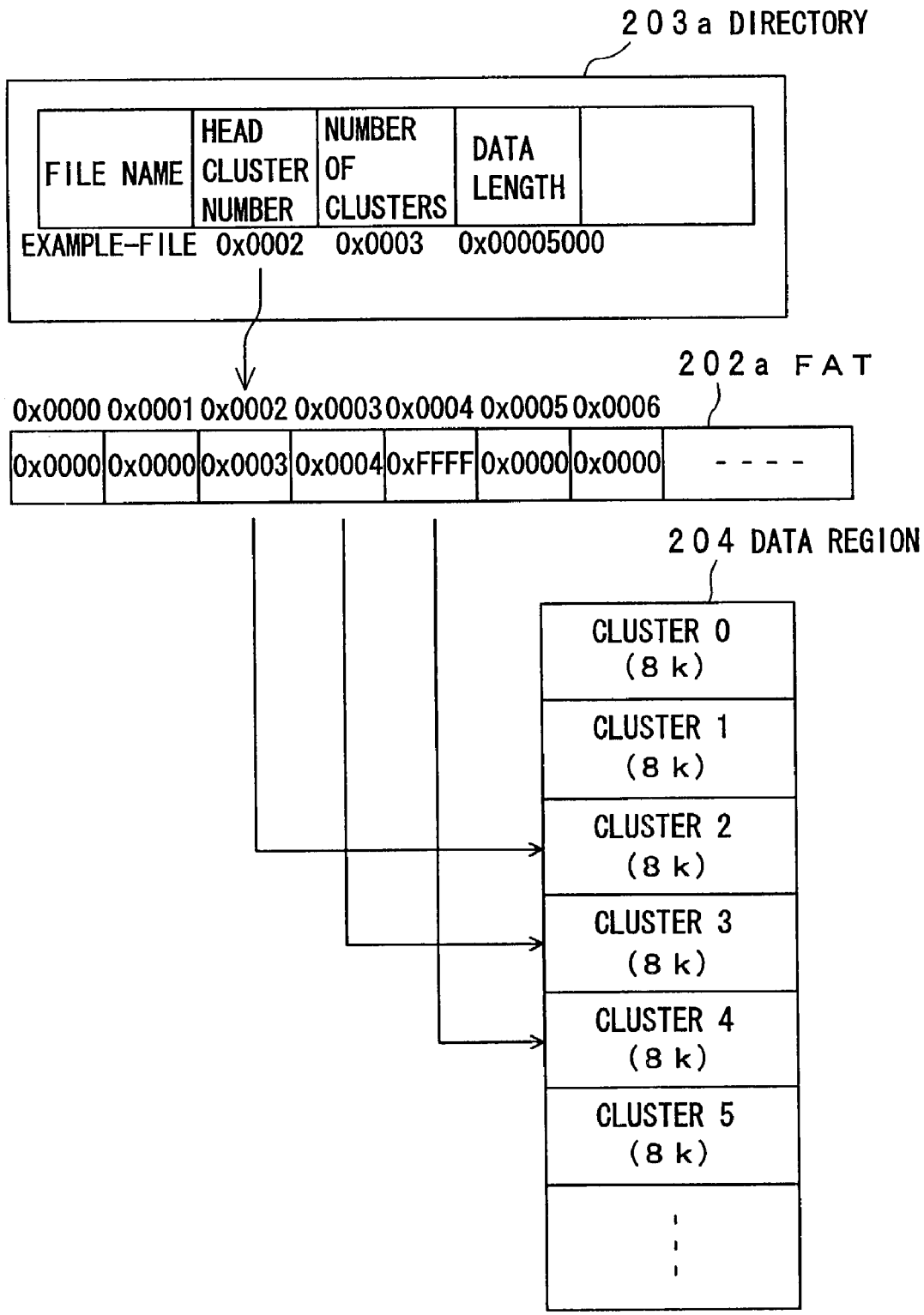
FIG. 12 is a view showing the retrieving operation of a file using the conventional FAT.

As shown in FIG. 11, at first the motion picture file is reproduced in the forward direction from the file head (S51). With the reproduction, the cluster chain retrieval is performed on the FAT from the file head towards the end (S52). As a result, the cluster numbers of the clusters to be reproduced in sequence are acquired.

It is determined whether the cluster numbers of the clusters to be reproduced which are acquired in sequence by the cluster chain retrieval are the S-th cluster or not (S53). Here S is set at a value which can be a predetermined arithmetic progression. The differential is set according to the desired offset intervals. For example, S is set to be 1, 6, 11, 16, - - - .

When a cluster acquired by the cluster chain retrieval is the S-th cluster, the cluster number and the offset position thereof are stored in the cluster table 30 (S54). These processes are repeated until the final frame is reached (S55).

Since the offset points are set at the predetermined intervals in the cluster table in the present embodiment, even when the size of the motion picture file is increased, the intervals of the offset points can be kept constant, thereby reducing an increase in the cluster retrieval time in reverse-direction reproduction resulting from an increase in file size.

The file reproducing apparatus and file reproducing method of the present invention explained in the aforementioned embodiments is particularly effective for information processing apparatuses such as digital still cameras or cellular phones which use a recording medium with a comparatively small capacity.

According to the invention, the file reproducing apparatus for reading and reproducing data stored in a recording medium is provided with a cluster table which manages the cluster numbers of data stored in the recording medium every predetermined offset position, thereby enabling data stored in the recording medium to be read and reproduced in the reverse direction without consuming the capacity of the recording medium.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2002-039503 filed on Feb. 18, 2002, which is expressly incorporated herein by reference in its entirety.

What is claimed is:

1. A file reproducing apparatus for reproducing files recorded on a recording medium using a FAT file system, the files to be reproduced including motion picture data, said file reproducing apparatus comprising:
a reading section that reads the motion picture data of a file from the recording medium;
a reproduction processor that applies a predetermined reproduction process to the motion picture data read by said reading section;
a data storage device; and
a controller configured to:
control said reading section, said reproduction processor, and said data storage device; and
generate a cluster table on said data storage device when the motion picture data is reproduced in a forward direction or when a cluster is retrieved for reading a header of a file including motion picture data, wherein:
the cluster table associates an offset position, indicating a position relative to a head of a file and being set at a predetermined offset interval, with a cluster number indicating a location on the recording medium on which the motion picture data at the corresponding offset position is stored;
said data storage device stores the cluster table; and
said controller determines a location on the recording medium at which the motion picture data to be read by said reading section is located with reference to the cluster table during a reproducing operation in a reverse direction which proceeds from an end of the file toward the head thereof.

2. The file reproducing apparatus according to claim 1, wherein the motion picture data includes a plurality of video frames.

3. The file reproducing apparatus according to claim 2, wherein said controller is configured to set the offset interval equal to a data length of a part when the entire motion picture data is divided substantially equally into N (N is a natural number) parts.

4. The file reproducing apparatus according to claim 2, wherein said controller is configured to set the offset interval equal to a data length of N (N is a natural number) video frames.

5. The file reproducing apparatus according to claim 4, wherein said controller is configured to change the number N of video frames according to a securable vacant capacity of said data storage device.

6. The file reproducing apparatus according to claim 1, wherein, if the cluster number of a video frame is already recorded in the cluster table, then said controller does not generate a cluster table related to the video frame when the video frame is going to be reproduced again in the forward direction.

7. The file reproducing apparatus according to claim 1, wherein, when a new cluster table is generated in the presence of the formerly generated cluster table, said controller overwrites a region of said storage device, on which the formerly generated cluster table is stored, to generate the new cluster table.

8. A file reproducing method for reproducing files recorded on a recording medium using a FAT file system, the files to be reproduced including motion picture data, said file reproducing method comprising:
generating a cluster table when the motion picture data is reproduced in a forward direction or when a cluster is retrieved for reading a header of a file including motion picture data, the cluster table associating an offset position, indicating a position relative to a head of a file and being set at a predetermined offset interval with a cluster number indicating a location on the recording medium on which the motion picture data at the corresponding offset position is stored; and
determining a location on the recording medium at which the motion picture data to be read is located with reference to the cluster table during a reproducing operation in a reverse direction which proceeds from an end of the file toward the head thereof.

9. The file reproducing method according to claim 8, wherein the motion picture data includes a plurality of video frames.

10. The file reproducing method according to claim 9, wherein, when the entire motion picture data is divided substantially equally into N (N is a natural number) parts, the offset interval is set to be equal to a data length of one of said parts.

11. The file reproducing method according to claim 9, wherein the offset interval is set to be equal to a data length of N (N is a natural number) video frames.

12. The file reproducing method according to claim 11, wherein the number N of video frames is changed according to a securable vacant capacity of a data storage device in which the cluster table is stored.

13. The file reproducing method according to claim 8, wherein, if the cluster number of a video frame is already recorded in the cluster table, then a cluster table related to the video frame is not generated when the video frame is going to be reproduced again in the forward direction.

14. The file reproducing method according to claim 8, wherein, when a new cluster table is generated in the presence of the formerly generated cluster table, overwriting a region of a storage device, on which the formerly generated cluster table is stored, to generate the new cluster table.

* * * * *

UNITED STATES PATENT AND TRADEMARK OFFICE
CERTIFICATE OF CORRECTION

| | | |
|---|---|---|
| PATENT NO. | : 7,359,623 B2 | Page 1 of 1 |
| APPLICATION NO. | : 10/365528 | |
| DATED | : April 15, 2008 | |
| INVENTOR(S) | : Yuzo Murakami | |

It is certified that error appears in the above-identified patent and that said Letters Patent is hereby corrected as shown below:

On the Title Page

Item (56), References Cited, under U.S. Patent Documents, please add the following reference --6,628,890, 9/2003, Yamamoto et al.--.

Signed and Sealed this

Seventeenth Day of March, 2009

JOHN DOLL
*Acting Director of the United States Patent and Trademark Office*